United States Patent [19]

Henderson et al.

[11] Patent Number: 4,815,761
[45] Date of Patent: Mar. 28, 1989

[54] AMPHIBIOUS SCUBA ASSIST DEVICES

[76] Inventors: Robert M. Henderson, 1707 36th Ave., Vero Beach, Fla. 32961; Brian Bahls, 717 Shore Dr., Vero Beach, Fla. 32963

[21] Appl. No.: 109,630

[22] Filed: Oct. 19, 1987

[51] Int. Cl.⁴ ............................................. B62B 1/20
[52] U.S. Cl. .............................. 280/47.3; 280/47.24; 280/47.331; 384/398; 441/129; 441/136
[58] Field of Search ................ 280/47.13 B, DIG. 7, 280/47.13 R, 47.14, 47.24, 47.32, 11.28, 47.3; 384/296, 398; 114/315; 441/129, 130, 132, 136

[56] References Cited

U.S. PATENT DOCUMENTS

| 298,838 | 5/1884 | Flagg | 280/11.28 |
| 689,020 | 12/1901 | Pruder | 441/129 |
| 2,510,549 | 6/1950 | Buchi | 384/398 |
| 2,967,058 | 1/1961 | Hoffman, Jr. | 280/47.24 |
| 2,974,331 | 3/1961 | Dize | 441/130 |
| 3,054,622 | 9/1962 | Davis et al. | 280/DIG. 7 |
| 3,758,128 | 9/1973 | Stenwall | 280/DIG. 7 |
| 3,865,392 | 2/1975 | Hartway | 280/47.13 R |

FOREIGN PATENT DOCUMENTS 20337 4/1935 Australia .............................. 441/130

Primary Examiner—David M. Mitchell
Assistant Examiner—Brian L. Johnson
Attorney, Agent, or Firm—Malin, Haley & McHale

[57] ABSTRACT

A device for use in making beach entry scuba dives by assisting the diver to transport scuba tanks and other diving gear across a beach or like land area and then serve as an off-shore floating work platform and dive flag holder has a quadrilateral frame, a roller unit and a handler unit. The frame is formed of hollow tubing and includes a force member, an aft member, and a pair of side members. The roller unit includes first and second arms that extend from the frame beyond the aft member, a buoyant roller, and bearings rotatably supporting the roller between the arms outboard of and parallel to the aft member. The handler unit includes third and fourth arms that extend from the frame beyond the fore member and a tubular handle member supported by the third and fourth arms outboard of the fore member. The frame carries a support surface and straps to support and retain tanks and other gear on the device.

6 Claims, 2 Drawing Sheets

U.S. Patent  Mar. 28, 1989  Sheet 1 of 2  4,815,761
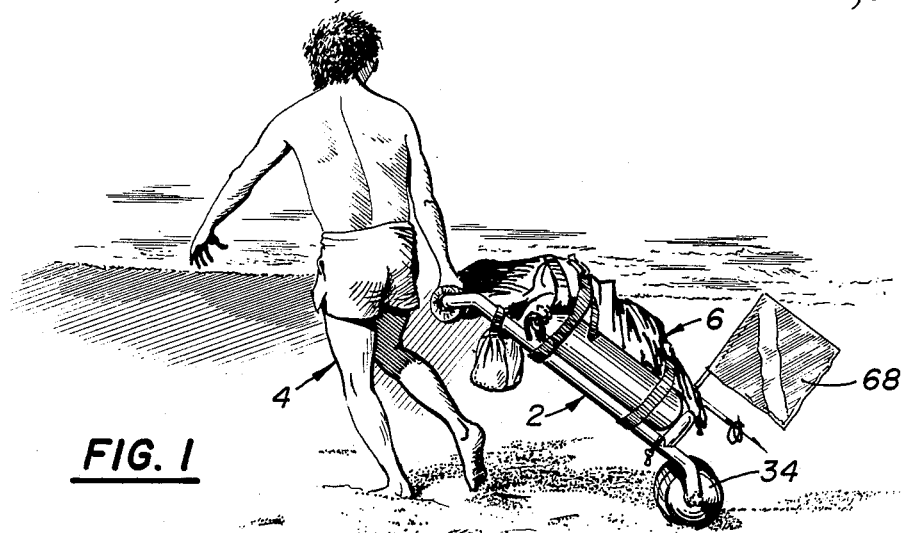
FIG. 1
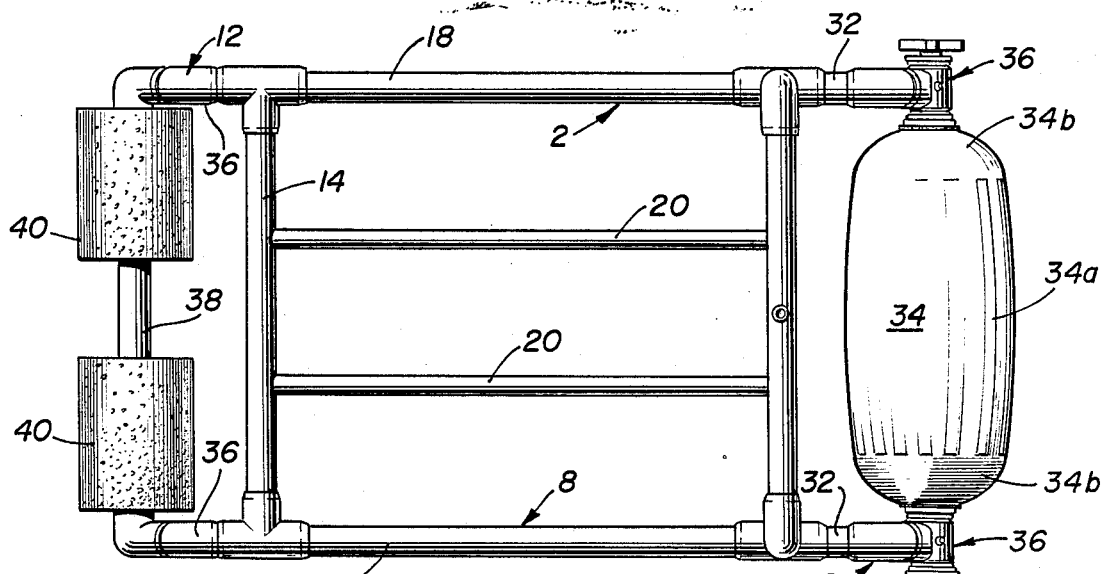
FIG. 2
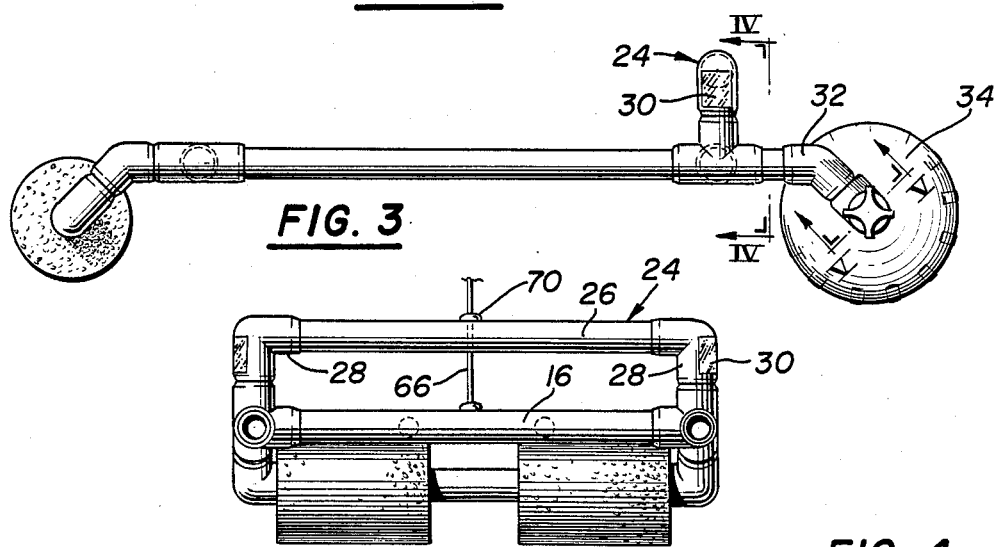
FIG. 3
FIG. 4

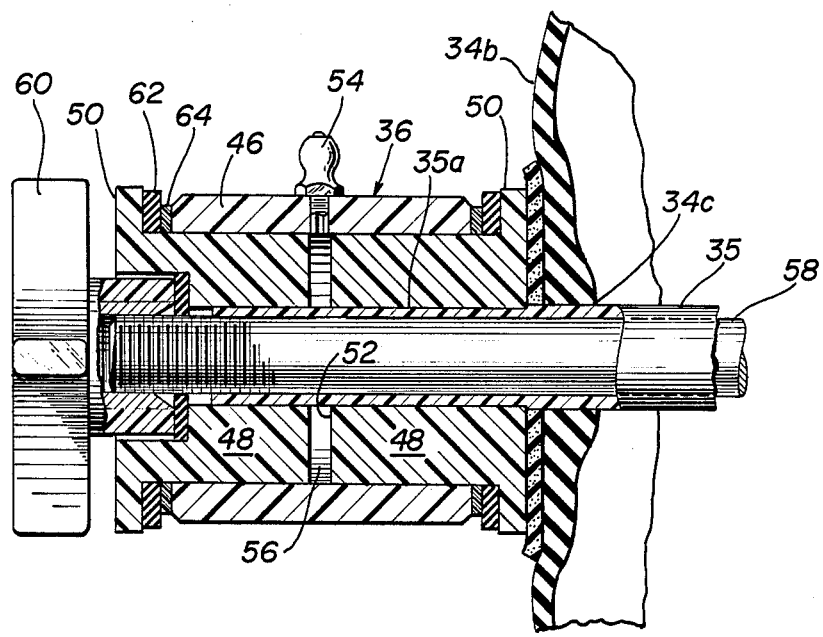
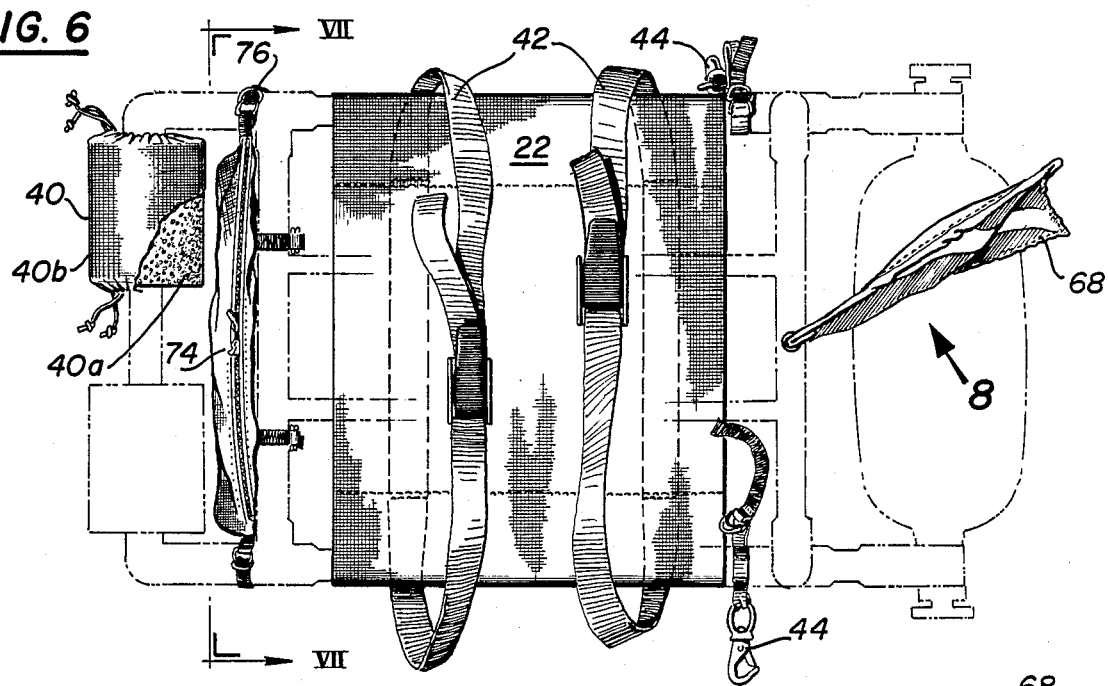
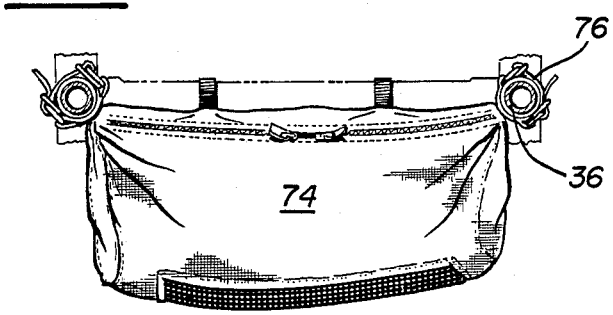
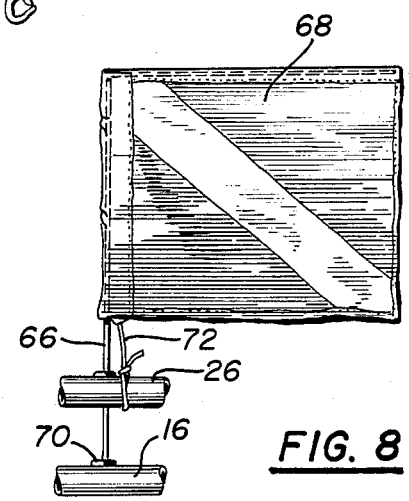

AMPHIBIOUS SCUBA ASSIST DEVICES

BACKGROUND OF THE INVENTION

1. Field of the Invention

This invention relates to amphibious scuba assist devices. More particularly, it concerns such devices for use in making beach entry scuba dives by assisting the diver to transport scuba tanks and other diving gear across a beach or like land area and into the water where the device serves as a floating work platform and dive flag holder.

2. Description of the Prior Art

While many submarine dives performed using self-contained underwater breathing apparatus (scuba) are made from boats, it is also conventional to make such dives from beaches or other land areas (beach entry dives). Normally, such dives involve transport of scuba tanks and other dive gear in an automobile or like transport as close to the water's edge as possible. Frequently, the automobile can not be driven closer than several hundred meters to the water so the diver is then required to carry the tanks and other gear over the beach to the water. Usually, the other gear will include a float from which a signal flag may be flown above the area where the beach entry dive is being performed. The present invention provides amphibious caddy devices to assist in the beach transport of scuba gear across a beach or other land area and then to further serve as a floating platform to support a signal flag and provide other assistance to the scuba diver at the offshore dive location.

There is often a need to transport many different type objects across beaches or other land areas, boats being a prime example. In order to make such transport tasks easier to perform, various forms of object movers have been devised, e.g., sleds, wheeled trailers and inflated roller devices (see U.S. Pat. Nos. 3,754,772; 4,127,281 and 4,243,239). The present invention uses inflated rollers to create a new form of beach transport devices that serve the additional function of an offshore floating platform.

OBJECTS

A principal object of the invention is the provision of new forms of amphibious devices for assisting scuba divers in making beach entry dives.

Further objects include the provision of:

1. A scuba gear caddy capable of serving the dual functions of (a) a land transport for scuba tanks and other gear an (b) and offshore work and flag platform in making beach entry dives.

2. Such devices capable of rolling across any hard surface, e.g., cement or asphalt, and any soft surface, e.g., sand or soft dirt, while carrying an amount of weight comparable to a complete set of scuba dive gear including an air tank.

3. Such devices that are capable of being pushed or pulled down or up a set of stairs, a sand dune or other incline while fully loaded with dive gear.

Other objects and further scope of applicability of the present invention will become apparent from the detailed description given hereinafter; it should be understood, however, that the detailed description, while indicating preferred embodiments of the invention, is given by way of illustration only, since various changes and modifications within the spirit and scope of the invention will become apparent to those skilled in the art from this detailed description.

SUMMARY OF THE INVENTION

The objects are accomplished, in part, in accordance with the invention by the provision of a device for use in making beach entry scuba dives by assisting the diver to transport scuba tanks and other diving gear across a beach or like land area and into the water where the device serves as a floating work platform and dive flag holder.

Basically, the devices of the invention comprise a quadrilateral frame, a roller unit and a handler unit.

The quadrilateral frame, which is formed of hollow tubing, includes a fore member, an aft member, and a pair of side members. The frame may further include a support surface stretched between the side members and a ledge unit that projects normally from the frame adjacent the aft member, which ledge unit has a section of tubing fixed on lateral lugs parallel to and spaced apart above the aft member.

The roller unit includes first and second arms that extend from the frame beyond the aft member, a buoyant roller, and bearing means rotatably supporting the roller between the arms, outboard of and parallel to the aft member.

The handler unit includes third and fourth arms that extend from the frame beyond the fore member and a tubular handle member supported by the third and fourth arms outboard of the fore member. Advantageously, the tubular handle member carries a pair of buoyant cylinders to contribute to the buoyance of the device.

In preferred embodiments, buckled straps are fixed to the support surface that encircle the frame and there are a plurality of tubes carried spaced apart by the fore and aft members of the frame between and parallel to the frame side members so such tubes provide assistance to the support surface in supporting scuba gear on the device.

The bearing means of the new devices advantageously comprise tubular housings carried by the first and second arms of the roller unit and a pair of flanged bushings are fitted into the housings with the flanges thereof external of the housing and with the internal lateral surfaces of the bushings being spaced apart from each other. A grease fitting communicates with the space existing between such lateral surfaces.

Preferably, the buoyant roller is formed of flexible plastic material and comprises a cylindrical outer surface and dished ends integral with such outer surface. The dished ends have small concentric holes therein and a tube having an O.D. about equal to the diameter of the holes extends through the holes and beyond the dished ends. Portions of the tube extending beyond the dished ends are mounted in the bushings, a rod extends through the tube and winged nuts are threaded onto the ends of the rod to compress the flanged bushings into the tubular housings of the roller unit.

Finally, the new devices include means to support the staff of a signal flag so as to stand vertically above the frame.

BRIEF DESCRIPTION OF THE DRAWINGS

A more complete understanding of the invention may be had by reference to the accompanying drawings in which:

FIG. 1 is perspective view of an amphibious device of the invention being used to transport scuba gear across a beach.

FIG. 2 is a plan view of the basic elements of the new amphibious device.

FIG. 3 is a lateral view of the structure shown in FIG. 2.

FIG. 4 is a sectional view taken on the line IV-IV of FIG. 3.

FIG. 5 is a sectional view taken on the line V-V of FIG. 3.

FIG. 6 is a plan view of auxiliary items in preferred embodiments of the new devices of the invention.

FIG. 7 is a sectional view taken on the line VII—VII of FIG. 6.

FIG. 8 is a fragmentary view taken in the direction of the arrow 8 of FIG. 6.

DESCRIPTION OF THE PREFERRED EMBODIMENTS

Referring in detail to the drawings, in which identical parts are identically marked, the invention comprises a device 2 for use in making beach entry scuba dives by assisting the diver 4 to transport scuba tanks and other diving gear 6 across a beach or like land area and into the water where the device serves as a floating work platform and dive flag holder.

Basically, the device 2 of the invention comprises a quadrilateral frame 8, a roller unit 10 and a handler unit 12.

The quadrilateral frame 8, which is formed of hollow tubing, includes a fore member 14, an aft member 16, and a pair of side members 18. The frame further includes a plurality of tubes 20 carried spaced apart by the fore member 14 and the aft member 16 between and parallel to said side members 18.

A support surface 22 is stretched between the side members 18 and a ledge unit 24 projects normally from the frame 8 above the aft member 16. The ledge unit 24 has a section of tubing 26 fixed on lateral lugs 28 parallel to and spaced apart above the aft member 16. Light reflectors 30 are attached to the lugs 28.

The roller unit 10 includes arms 32 that extend longitudinally from the frame beyond the aft member 16, a buoyant roller 34, and bearing means 36 rotatably supporting the roller 34 between the arms 32, outboard of and parallel to the aft member 16.

The buoyant roller 34 is formed of flexible plastic material and comprises a cylindrical outer surface 34a and dished ends 34b that have small concentric holes 34c therein and a tube 35 having an O.D. about equal to the diameter of the holes 34c extends through the holes and beyond the dished ends 34b.

The handler unit 12 includes arms 36 that extend longitudinally from the frame 8 beyond the fore member 14 and a tubular handle member 38 supported by the arms 36 outboard of the fore member 14. The tubular handle member 38 carries a pair of buoyant cylinders 40, e.g., cylinders of plastic foam 40a covered with canvas 40b.

Buckled straps 42 are fixed to the support surface 22 that encircle the frame and swivel snap hooks 44 are tethered to the frame 8.

The bearing means 36 comprise tubular housings 46 carried by the arms 32 and a pair of flanged bushings 48 are fitted into the housings 46 with the flanges 50 thereof external of the housing 48. The internal lateral surfaces 52 of the bushings 48 are spaced apart from each other and a grease fitting 54 communicates with the space 56 existing between the lateral surfaces 52.

Portions 35a of the plastic tube 35 that extend beyond the dished ends 34b are mounted in the bushings 48, a metal rod 58 extends through the tube and winged nuts 60 are threaded onto the ends of the rod 58 to compress the flanged bushings 48 against the washers 62 & 64 and into the tubular housings 46.

Means to support the staff 66 of a signal flag 68 comprises small holes (not shown), fitted with grommets 70, in the tubes 16 & 26. A lanyard 72 serves to hold the flag 68 in place on the frame 8.

A zippered pouch 74 is fastened by straps 76 on the arms 14 of the handler unit 12. The pouch may be used to store an anchor with its rode or like tether means plus other type gear.

In typical use of the new scuba assist devices, tanks, body weights, fins etc. will be transported across the beach or other land area to the water's edge. Here, the diver will remove such gear from the device and install it on his body leavng little or no scuba gear on the device. The diver then proceeds into the water pulling the device behind. Since it draws only a few inches of water, it will start to float almost immediately. When the diver reaches the off-shore dive position, the device will be anchored to serve to support the dive flag and as a working platform, e.g., an out of water surface upon which to place fish that may be bleeding. Also, it provides the diver with means upon which to hold while resting between dives, etc.

What is claimed is:

1. A device for use in making beach entry scuba dives by assisting the diver to transport scuba tanks and other diving gear across a beach or like land area and then serve as a floating work plaltform and dive flag holder which comprises: a quadrilateral frame, a roller unit and a handler unit, said quadrilteral frame formed of hollow tubing including:
   a fore member,
   an aft member, and
   a pair of side members, said roller unit including:
   first and second arms that extend from said frame beyond said aft member,
   a buoyant roller, and
   bearing means rotatably supporting said roller between said arms, outboard of and parallel to said aft member, and
   said handler unit including:
   third and fourth arms that extend from said frame beyond said fore member and
   a tubular handle member supported by said third and fourth arms outboard of said fore member.
   said buoyant roller is formed of flexible plastic material and comprises a cylindrical outer surface and dished ends integral with said outer surface,
   said dished ends have small concentric holes therein and a tube having an O.D. about equal to the diameter of said holes extends through said holes and beyond said dished ends,
   portions of said tube extending beyond said dished ends are mounted in bearing means comprising a pair of tubular housings carried by said first and second arms and a pair of flanged bushings fitted into the housings with the flanges external of the housings,
   a rod extends through said tube and winged nuts are threaded onto the ends of said rod to compress said flanged bushings into said tubular housings.

2. A amphibious scuba diving tank transporting apparatus for movement over land and water, comprising:
- a hand truck means for transporting a scuba diving tank over land and across a beach,
- a buoyant platform means for transporting the scuba diving tank over water,
- said truck means and said platform means including:
  - a frame means having a generally elongated shape,
  - a buoyant roller system connected to a first side of said frame means,
  - a buoyant handle system connected to a second side of said frame means,
  - said buoyant roller system includes a first buoyant means and a roller means,
  - said buoyant handle system includes a second buoyant means and a handle means,
  - said truck means utilizes said roller means on the land and said handle means in the users hand relatively high above the land,
  - said platform means utilizes said first buoyant means and said second buoyant means in the water to support said frame at or above the surface of the water,
  - said frame means for supporting the scuba diving tank,
  - said buoyant roller system including:
    - a first end means connected to each end of said first buoyant means for supporting said first buoyant means in water and to each end of said roller means for allowing said roller means to rotate over land,
    - a first frame connector means having a base connected to said frame means and a distal end portion projecting outward and downward from said frame means connected to said first buoyant means and said roller means,
    - said first frame connector means constructed, positioned and aranged to support, unobstructed by said frame means, said first buoyant means below and to one side of said frame means to support said frame means along with the support of said buoyant handle system at or above the surface of the water when said apparatus is in the water and utilized as a buoyant platform means,
    - said first frame connector means constructed, positioned and arranged to support, unobstructed by said frame means said roller means below and to said one side of said frame means to support said roller means in a distal position to allow said roller means to freely contact the land unobstructed by said apparatus when said frame means is in a generally horizontal position or when said buoyant handle system is raised above the land to utilize said apparatus as a hand truck, said buoyant handle system including:
  - said frame means for supporting said buoyant handle system,
    - a second end means connected to each end of said second buoyant means for supporting said second buoyant means in water and to each end of said handle means for lifting one end of said frame means above the land to operate said apparatus as said hand truck,
    - a second frame connector means having a base connected to said frame means and a distal end portion projecting outward and downward from said frame means connected to said second buoyant means and said handle means,
    - said second frame connector means constructed, positioned and arranged to support, unobstructed by said frame means said second buoyant means below and to the other side of said frame means to support said frame means along with the support of said buoyant roller system at or above the surface of the water when said apparatus is in the water and utilized as a buoyant platform means,
    - said second frame connector means constructed positioning and arranged to support, unobstructed by said frame means said handle means below and to said other side of said frame means to support said handle means in a distal position to allow said handle means to be utilized as an outwardly projecting hand truck handle unobstructed by said apparatus when one end of said frame means is raised above the horizontal position to utilize said apparatus as a hand truck.

3. The apparatus as set forth in claim 2, wherein:
said frame means is generally rectangular in shape and having a plurality of hollow frame members.

4. The appparatus as set forth in claim 3, wherein:
said frame means connected to and supporting a support means connected between said hollow members, said support means for supporting the scuba diving tank,
said first buoyant means and said roller means is a buoyant roller.

5. The apparatus as set forth in claim 4, wherein:
said frame means includes a base support means projecting upwardly from said frame adjacent said buoyant roller system,
said base support means for supporting the base of scuba diving tanks on said support means.

6. A amphibious scuba diving tank transporting apparatus for movement over land and water, comprising:
- a hand truck means for transporting a scuba diving tank over land and across a beach,
- a buoyant platform means for transporting the scuba diving tank over water,
- said truck means and said platform means including:
  - a frame means,
  - a buoyant roller connected to a first side of said frame means,
  - a buoyant handle connected to a second side of said frame means,
  - said truck means utilized said buoyant roller on the land and said buoyant handle in the users hand relatively high above the land with said frame at a relatively large acute angle when used as a hand truck,
  - said platform means utilizes said buoyant roller and said buoyant handle in the water to support said frame at or above the surface of the water in a generally horizontal position when use as a platform,
  - said truck means and said platform means for supporting the scuba diving tank,
  - said buoyant roller connected to said apparatus for supporting said buoyant roller in water and to rotate over land,
  - a first connector means constructed, positioned and arranged to support said buoyant roller below and to one side of said apparatus in a position projecting outward and downward from said apparatus to support said apparatus along with the support of said buoyant handle at or above the surface of the water when said apparatus is in the water to be utilized as said platform means, said first connector means constructed, positioned and arranged to support said buoyant roller below and to one side of said apparatus in a position projecting outward and downward from said apparatus to support said apparatus at a distal position allowing said buoyant roller to freely contact the land unobstructed by said apparatus and said first connector means when said frame means is in a generally horizontal position or when said buoyant handle is raised above the land to utilize said apparatus as said hand truck, said buoyant handle connected to said apparatus for supporting said buoyant roller in water and for lifting one end of said apparatus above the land to operate said apparatus as said hand truck, a second connector means constructed, positioned and arranged to support said buoyant handle below and to the other side of said apparatus in a position projecting outward and downward from said apparatus to support said apparatus along with the support of said buoyant roller at or above the surface of the water when said apparatus is in the water and utilized as said platform means, said second connector means constructed positioning and arranged to support said buoyant handle below and to said other side of said apparatus in a position projecting outward and downward from said apparatus to support said apparatus at a distal position allowing said buoyant handle to be utilized as an outwardly projecting hand truck handle unobstructed by said apparatus when said frame means is raised above the horizontal position to utilize said apparatus as a hand truck.

* * * * *